United States Patent
Agathocleous et al.

(10) Patent No.: US 10,875,379 B2
(45) Date of Patent: Dec. 29, 2020

(54) HVAC EXTENDED CONDENSING CAPACITY

(71) Applicant: Hanon Systems, Daejeon (KR)

(72) Inventors: Nicos Agathocleous, Canton, MI (US); James Tasiopoulos, Saint Clair Shores, MI (US); Dennis Vermette, Westland, MI (US); Eric Haupt, Livonia, MI (US)

(73) Assignee: HANON SYSTEMS, Daejeon (KR)

( * ) Notice: Subject to any disclaimer, the term of this patent is extended or adjusted under 35 U.S.C. 154(b) by 97 days.

(21) Appl. No.: 16/242,091

(22) Filed: Jan. 8, 2019

(65) Prior Publication Data

US 2019/0366794 A1    Dec. 5, 2019

Related U.S. Application Data

(60) Provisional application No. 62/678,661, filed on May 31, 2018.

(51) Int. Cl.
*B60H 1/00* (2006.01)
*F24F 11/30* (2018.01)
(Continued)

(52) U.S. Cl.
CPC ..... *B60H 1/00028* (2013.01); *B60H 1/00485* (2013.01); *B60H 1/00792* (2013.01);
(Continued)

(58) Field of Classification Search
CPC ............ B60H 1/00028; B60H 1/00878; B60H 1/00792; B60H 1/00485; B60H 1/3213;
(Continued)

(56) References Cited

U.S. PATENT DOCUMENTS

2010/0326127 A1\* 12/2010 Oomura ................ F25B 41/04
62/498
2013/0227973 A1\* 9/2013 Kang ..................... F25D 21/12
62/80

(Continued)

FOREIGN PATENT DOCUMENTS

EP  2679419 A1  1/2014
EP  3260319 A1  12/2017
(Continued)

*Primary Examiner* — Emmanuel E Duke
(74) *Attorney, Agent, or Firm* — Shumaker, Loop & Kendrick, LLP; James D. Miller

(57) ABSTRACT

A heat pump system for a vehicle comprises a heating, ventilating, and air conditioning module as well as a refrigerant circuit including a compressor, an internal condenser, and an external condenser. The module comprises a warm air path including the internal condenser, a cold air path formed independently from the warm air path, a purge flow path branching from the warm air path at a position downstream of the internal condenser with respect to a flow of air through the module, and a purge control door adjustable between a first position preventing fluid communication between the warm air path and the purge flow path and a second position allowing fluid communication between the warm air path and the purge flow path. The purge flow path provides fluid communication between the warm air path and the ambient environment.

15 Claims, 4 Drawing Sheets

(51) Int. Cl.
*F25B 41/04* (2006.01)
*B60H 1/32* (2006.01)

(52) U.S. Cl.
CPC ....... *B60H 1/00878* (2013.01); *B60H 1/3213* (2013.01); *F24F 11/30* (2018.01); *F25B 41/04* (2013.01); *B60H 1/00278* (2013.01); *B60H 1/00392* (2013.01); *B60H 1/00428* (2013.01); *B60H 2001/003* (2013.01); *B60H 2001/0015* (2013.01); *B60H 2001/00092* (2013.01)

(58) Field of Classification Search
CPC .......... B60H 2001/003; B60H 1/00428; B60H 1/00278; B60H 1/00392; B60H 2001/00092; B60H 2001/0015; B60H 2001/00178; B60H 1/32281; B60H 2001/00307; B60H 1/00921; B60H 1/00007; B60H 1/00899; F25B 41/04; F25B 5/02; F25B 6/04; F25B 25/005; F25B 30/02; F25B 6/00; F24F 11/30; F24F 7/007; F28F 27/00
See application file for complete search history.

(56) References Cited

U.S. PATENT DOCUMENTS

| | | | | |
|---|---|---|---|---|
| 2013/0333406 | A1* | 12/2013 | Takahashi | B60H 1/00007 62/238.7 |
| 2014/0069123 | A1* | 3/2014 | Kim | F25B 49/02 62/61 |
| 2015/0217625 | A1* | 8/2015 | Kang | F25B 30/06 62/160 |
| 2017/0087956 | A1* | 3/2017 | Graaf | B60H 1/00921 |
| 2017/0361677 | A1* | 12/2017 | Kim | B60L 58/24 |

FOREIGN PATENT DOCUMENTS

| | | |
|---|---|---|
| JP | H08258543 A | 10/1996 |
| KR | 20130101263 A | 9/2013 |
| KR | 20150039545 A | 4/2015 |

\* cited by examiner

HVAC EXTENDED CONDENSING CAPACITY

CROSS-REFERENCE TO RELATED APPLICATIONS

This patent application claims priority to U.S. Provisional Patent Application No. 62/678,661 filed on May 31, 2018, the entire disclosure of which is hereby incorporated herein by reference in its entirety.

FIELD OF THE INVENTION

The present disclosure relates generally to a heat pump system and, more particularly, to a heat pump system for a vehicle that includes an external condenser and an internal condenser that both provide heat rejection from a refrigerant circulated by the heat pump system.

BACKGROUND OF THE INVENTION

A heat pump is a heating and cooling system that uses a refrigerant to transfer heat from one side of the system to another side of the system to be operable to provide both cooling air during hot times and to provide heating during cold times. Known automotive heat pump systems often utilize an internal heat pump heat exchanger (HP-HEX), alternatively referred to herein as an internal condenser, within an HVAC module as the main heat source for cabin heating. Such heat pump systems additionally utilize an external condenser at the front of the vehicle for rejecting heat directly from the refrigerant to the ambient environment, where the internal condenser is used for heating purposes only during a heating mode of the heat pump system. During an air-conditioning (air cooling) mode the internal condenser operates as only a pass through for the refrigerant and is not utilized as air is not caused to pass over the internal condenser based on a configuration of the components forming the HVAC module. For example, one known heat pump system relies solely on the external condenser for rejecting heat directly from the refrigerant to the ambient environment during the air conditioning mode, where the air is diverted away from the internal condenser by a door used to control a distribution of air within the HVAC module.

When the physical size, and thus capacity, of the external condenser is limited by vehicle package space it becomes necessary, under extreme high load conditions, to reject more heat than the capacity of the external condenser allows. Failure to reject this extra heat results in reduced system performance, system instability or system shutdown.

It would therefore be beneficial to utilize the internal condenser to reject additional heat from the refrigerant. However, the placement of the internal condenser within the HVAC module presents an issue that any air exchanging heat with the internal condenser could negatively affect the ability for the heat pump system to cool and condition the air entering the vehicle cabin in accordance with the requirements of a passenger of the vehicle.

It would therefore be desirable to produce a heat pump system that is capable of simultaneously utilizing both an internal condenser and an external condenser for rejecting heat from a refrigerant of the heat pump system without negatively affecting an ability of the heat pump system to condition air to be delivered to the cabin of the vehicle.

SUMMARY OF THE INVENTION

Compatible and attuned with the present invention, a heat pump system utilizing both an internal condenser and an external condenser for heat rejection from a refrigerant of the heat pump system has surprisingly been discovered. More specifically, the following discussion describes a heat pump system for a vehicle that employs a purge control door in an HVAC module located downstream of an internal condenser, wherein the purge control door can be opened to create a purge flow path through the HVAC module and out to the ambient environment. The HVAC module is configured wherein the purge flow path is independent and does not affect the ability of the HVAC module to simultaneously provide cooled and conditioned air to the cabin. Additional features of the disclosure will become apparent from the following description and appended claims, taken in conjunction with the accompanying drawings.

In one embodiment of the invention, a heating, ventilating, and air conditioning (HVAC) module for a heat pump system comprises a warm air path including an internal condenser, a cold air path formed independently from the warm air path, a purge flow path branching from the warm air path at a position downstream of the internal condenser with respect to a flow of air through the module, and a purge control door adjustable between a first position preventing fluid communication between the warm air path and the purge flow path and a second position allowing fluid communication between the warm air path and the purge flow path. The purge flow path provides fluid communication between the warm air path and the ambient environment.

In another embodiment of the invention, a heat pump system for a vehicle comprises a refrigerant circuit including a compressor, an internal condenser, and an external condenser and a module for a heating, ventilating, and air conditioning system. The module comprises a warm air path including an internal condenser, a cold air path formed independently from the warm air path, a purge flow path branching from the warm air path at a position downstream of the internal condenser with respect to a flow of air through the module, and a purge control door adjustable between a first position preventing fluid communication between the warm air path and the purge flow path and a second position allowing fluid communication between the warm air path and the purge flow path. The purge flow path provides fluid communication between the warm air path and the ambient environment.

A method of operating a heat pump system is also disclosed. The method comprises a step of providing a module for a heating, ventilating, and air conditioning system. The module includes a warm air path including the internal condenser, a cold air path formed independently from the warm air path, a purge flow path branching from the warm air path at a position downstream of the internal condenser with respect to a flow of air through the module, and a purge control door disposed at an entrance to the purge flow path, wherein the purge flow path provides fluid communication between the warm air path and the ambient environment. The method further includes a step of adjusting the purge control door to selectively provide fluid communication between the warm air path and the purge flow path.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

The following discussion of the embodiments of the disclosure directed to a heat pump system that includes an external condenser and an internal condenser that provide heat rejection is merely exemplary in nature, and is in no way intended to limit the disclosure or its applications or uses. The present disclosure proposes using an external condenser located at the front of the vehicle in an automotive heat pump system as the main element for rejecting heat directly from the refrigerant to the ambient environment, and also using an internal condenser as a booster to provide additional heat rejection directly from the refrigerant to the ambient environment during extreme high load conditions, and additionally during a charging of a battery of the vehicle during a period of time when cooling the cabin is not needed.

Figure 1:
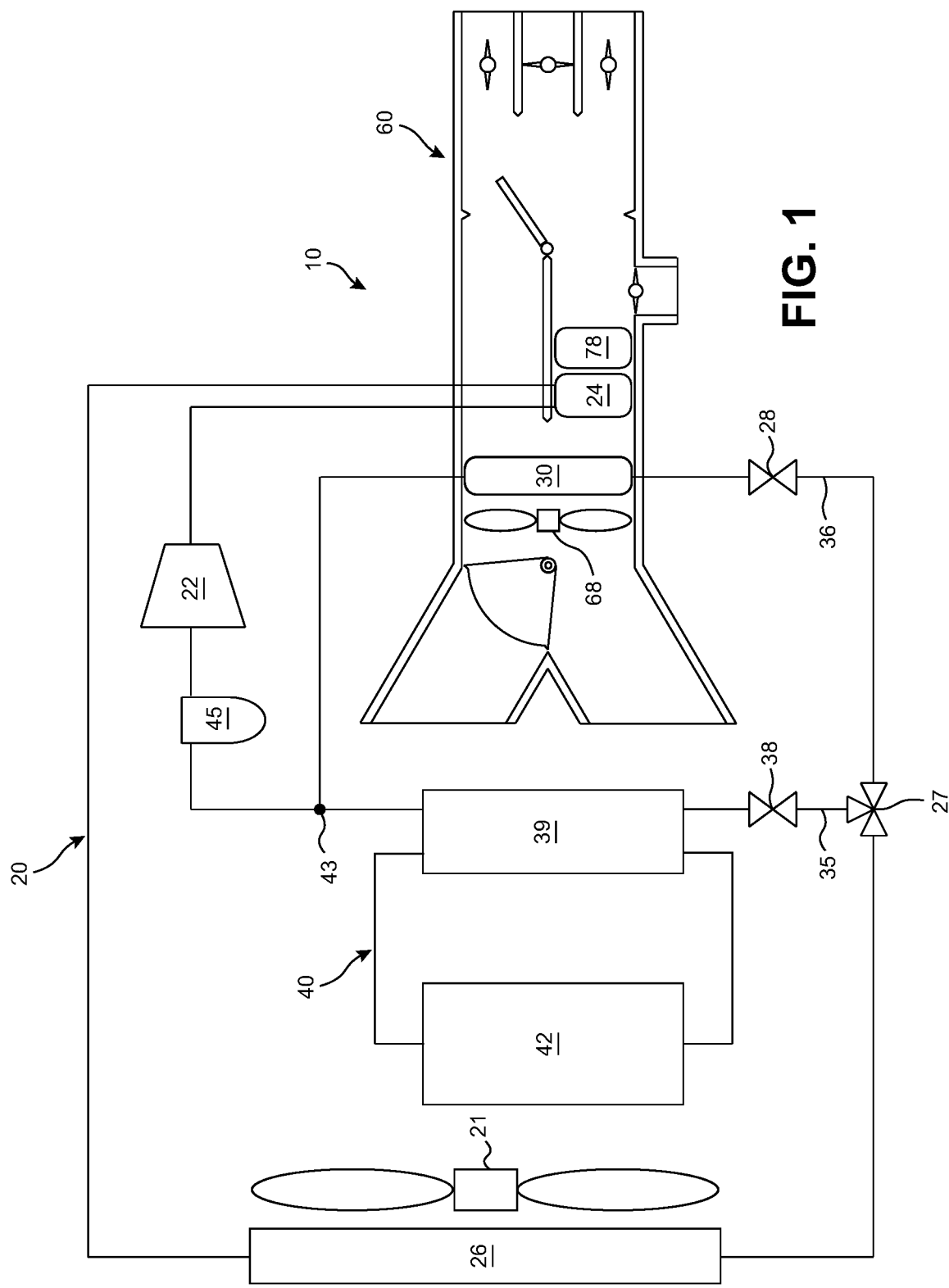
FIG. 1 is a schematic drawing of a heat pump system that includes an internal condenser disposed within an HVAC module and an external condenser disposed exterior to the HVAC module according to an embodiment of the invention.

FIG. 1 illustrates an exemplary heat pump system 10 according to an embodiment of the present invention. The heat pump system 10 may be applicable for use as part of a heating, ventilating, and air conditioning (HVAC) system for an electric vehicle in order to provide both cabin heating and cooling, wherein the heat pump system 10 uses a refrigerant as a heat exchange medium circulated by the heat pump system 10. However, the disclosed heat pump system 10 may alternatively be configured for use in any type of motor vehicle for use in any application, as desired, without departing from the scope of the present invention. The heat pump system 10 is illustrated in FIG. 1 as including a refrigerant circuit 20, a coolant circuit 40, and an HVAC module 60.

The refrigerant circuit 20 generally includes a compressor 22, an internal condenser 24, an external condenser 26, an evaporator expansion element 28, and an evaporator 30. The compressor 22 is configured to receive a low temperature, low pressure gaseous refrigerant and to output a relatively high temperature, high pressure gaseous refrigerant. The high temperature, high pressure gaseous refrigerant then flows through the internal condenser 24 disposed within the HVAC module 60. The internal condenser 24 is configured to transfer heat from the high temperature, high pressure refrigerant passing through the internal condenser 24 to a supply of air passing through the HVAC module 60 and passing over the internal condenser 24. As explained in greater detail hereinafter, a flow rate and a flow volume of the air passing over the internal condenser 24 may be regulated depending on the selected operational mode of the heat pump system 10, and more specifically based on the extent of heat exchange desired between the refrigerant and the flow of the air for achieving desired conditions within the cabin of the motor vehicle.

Heat transfer from the refrigerant to the air passing through the HVAC module 60 may cause at least a portion of the gaseous refrigerant to condense within the internal condenser 24 depending on the operating conditions of the heat pump system 10. In other circumstances, the internal condenser 24 may only cool the gaseous refrigerant passing therethrough in the absence of the condensing of the refrigerant, hence the internal condenser 24 may alternatively be referred to as a "gas cooler." As such, it should be understood that each reference herein to a "condenser" may refer to any heat exchanger disposed downstream of the compressor 22 and configured for cooling a supply of relatively high temperature and high pressure gaseous refrigerant regardless of the extent at which the refrigerant condenses therein.

The external condenser 26 is disposed downstream from the internal condenser 24 and is configured to transfer heat from the refrigerant to a supply of air passing over the external condenser 26, which may be air originating from the ambient environment. The external condenser 26 is accordingly configured to further cool and/or condense the refrigerant following the (optional) cooling and/or condensing of the refrigerant within the upstream arranged internal condenser 24. A blower unit 21 may be disposed adjacent the external condenser 26 for controlling a flow of the ambient air into the external condenser 26. The external condenser 26 and the blower unit 21 may be disposed adjacent a front portion of the vehicle, as desired.

The refrigerant flows from the external condenser 26 to a three-way valve 27 forming a branch point of the refrigerant circuit 20 dividing the refrigerant circuit 20 into a coolant circuit pathway 35 and an evaporator pathway 36. The coolant circuit pathway 35 and the evaporator pathway 36 are then recombined at a node 43 to cause the pathways 35, 36 to be arranged in parallel with respect to the refrigerant circuit 20.

The coolant circuit pathway 35 includes a chiller expansion element 38 and a chiller 39. The chiller expansion element 38 is configured to constrict and then expand the liquid refrigerant in order to lower the temperature and the pressure of the liquid refrigerant when passing through the chiller expansion element 38. A flow area through the chiller expansion element 38 may be adjustable in order to control the heat exchange capacity of the chiller 39 via the control of the temperature and pressure of the refrigerant passing through the chiller expansion element 38.

The chiller 39 is a heat exchanger, and more particularly an evaporator, in heat exchange relationship with the coolant circuit 40. The coolant circuit 40 includes the chiller 39 and at least one heat generating component 42. The coolant circuit 40 may further include at least one pump (not shown) for causing a coolant to circulate through the coolant circuit 40. The at least one heat generating component 42 may be any heat generating component in need of cooling including a battery acting as a power source of the vehicle, an inverter associated with an electrical component such as the compressor 22, or a component associated with a drive mechanism of the motor vehicle, as non-limiting examples. Any component capable of producing waste heat may be utilized as the at least one heat generating component 42 without departing from the scope of the present invention.

The chiller 39 and the heat generating component 42 are illustrated as being separately formed and connected via a fluid line communicating the coolant therebetween. However, it should be understood that the chiller 39 may be in a direct heat transfer relationship with the at least one heat generating component 42 in the absence of the coolant without departing from the scope of the present invention. It should also be understood that the coolant circuit 40 may include additional components, valves, and fluid lines for achieving additional objects of the heat pump system 10 in addition to those shown and described herein. For example, the coolant circuit 40 may be in heat exchange relationship with a heat exchanger disposed within the HVAC module 60 used to provide supplemental heating to the air delivered to the cabin of the vehicle. The coolant circuit 40 may accordingly have any suitable configuration for transferring heat between the refrigerant passing through the coolant circuit pathway 35 and the at least one heat generating component 42 while remaining within the scope of the present invention.

The chiller 39 is configured to transfer heat from the coolant and/or the at least one heat generating component 42 and to the low temperature, low pressure liquid refrigerant in order to increase the temperature of the refrigerant, thereby evaporating at least a portion of the liquid refrigerant within the chiller 39. The chiller 39 may operate in this manner when the heat pump system 10 is operated in an air conditioning or component cooling mode, as explained in greater detail hereinafter.

However, under other circumstances, the chiller 39 may alternatively be configured to transfer heat from the refrigerant to the coolant and/or the at least one heat generating component 42. This may occur when the at least one heat generating component 42 is an electrical component and the vehicle is exposed to especially low ambient temperatures. The heating of the electrical component may be performed when an efficiency of the electrical component is dependent on the electrical component operating at a minimum temperature value, as desired. The chiller 39 may further be configured to transfer waste heat generated by the at least one heat generating component 42 to the refrigerant during a heating mode of the heat pump system 10, wherein the heating mode is omitted from description herein for simplicity.

The evaporator pathway 36 includes the evaporator expansion element 28 and the evaporator 30. The evaporator expansion element 28 is configured to constrict and then expand the liquid refrigerant passing therethrough in order to lower the temperature and the pressure of the liquid refrigerant. A flow area through the evaporator expansion element 28 may accordingly be adjustable in order to control a heat exchange capacity of the evaporator 30. The evaporator 30 is disposed within the HVAC module 60 and is configured to transfer heat from the air passing through the HVAC module 60 and to the low temperature and low pressure refrigerant, thereby evaporating at least a portion of the refrigerant.

The three-way valve 27 may be configured for distributing the refrigerant to one or both of the coolant circuit pathway 35 and the evaporator pathway 36 depending on various aspects of the heat pump system 10, such as the desired amount of cooling required for the at least one heat generating component 42 or for the air passing through the HVAC module 60 for delivery to the cabin of the vehicle.

The refrigerant flows to a collector 45 after passing through the node 43. The collector 45 is configured to collect any liquid refrigerant that has not yet been evaporated within the chiller 39 or the evaporator 30 to prevent undesired entry of the liquid refrigerant into the compressor 22. The remaining gaseous refrigerant is returned to a low pressure side of the compressor 22 to repeat the aforementioned process.

Figure 2:
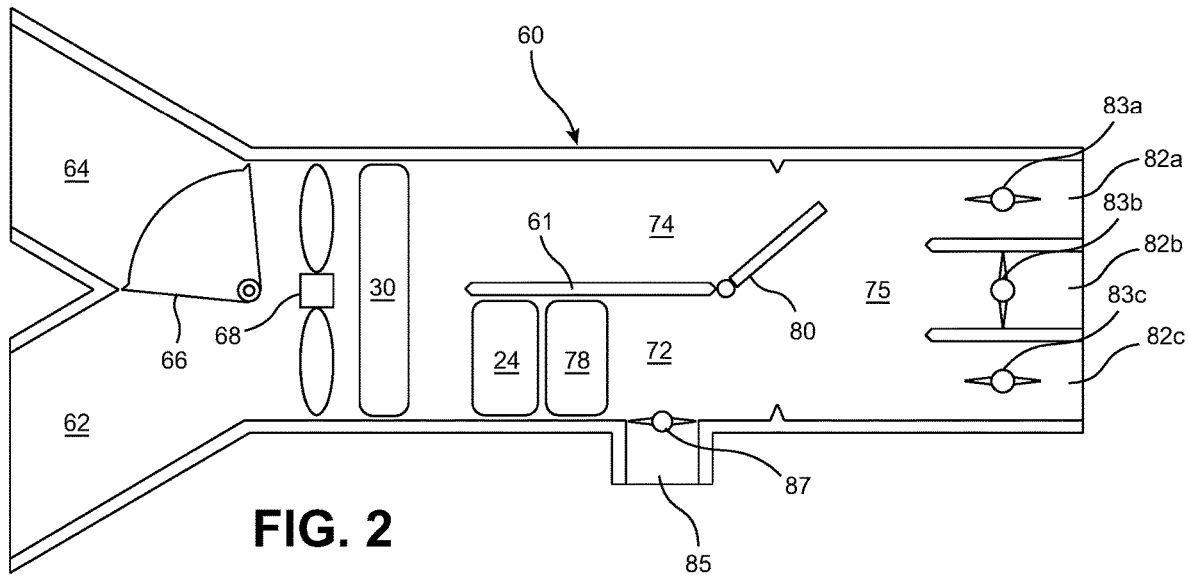
FIG. 2 is a cross-sectional view of the HVAC module of FIG. 1 configured for a first mode of operation thereof wherein a purge flow path of the HVAC module is closed.

Referring now to FIG. 2, which shows the HVAC module 60 in isolation, the HVAC module 60 forms a housing or casing defining a flow path for the supply of the air exchanging heat with each of the evaporator 30 and the internal condenser 24. An inlet end of the HVAC module 60 includes a recirculation flow path 62 and a fresh air flow path 64. The recirculation flow path 62 provides recirculated air originating from the cabin of the vehicle while the fresh air flow path 64 provides fresh air originating from the ambient environment. An air source control door 66 is configured to control a distribution of the air entering the HVAC module 60 from each of the recirculation flow path 62 and the fresh air flow path 64. The air source control door 66 is illustrated in FIG. 2 as having a generally fan-shaped cross-sectional shape including an arcuate surface displaced from an axis of rotation of the air source control door 66, but it should be understood that any suitable configuration of the air source control door 66 may be used without necessarily departing from the scope of the present invention. The air source control door 66 may alternatively be formed as a substantially planar flap having an axis of rotation adjacent the intersection of the recirculation flow path 62 and the fresh air flow path 64 or a sliding door configured to variably block one or both of the flow paths 62, 64, as non-limiting alternative examples. The HVAC module 60 may alternatively be provided with only a single flow path delivering air to the interior of the HVAC module 60 without necessarily departing from the scope of the present invention.

A blower unit 68 disposed downstream of the air source control door 66 draws air into the HVAC module 60 and pressurizes the air in order to deliver the air to the various different vents associated with the cabin of the vehicle. A filter (not shown) may be disposed upstream or downstream of the blower unit 68 for filtering the air to be delivered to the cabin of the vehicle.

The evaporator 30 is disposed downstream of the blower unit 68 and extends across an entirety of the flow cross-section of the HVAC module 60. As such, an entirety of the air passing through the HVAC module 60 is caused to pass through the evaporator 30 before being further conditioned by components of the HVAC module 60 such as the internal condenser 24.

The HVAC module 60 includes a wall 61 dividing the HVAC module 60 into a warm air path 72 and a cold air path 74 downstream of the evaporator 30 and upstream of a mixing section 75 of the HVAC module 60. The warm air path 72 generally refers to a flow path through the HVAC module 60 upstream of the mixing section 75 and including the components suitable for transferring heat to the air passing through the HVAC module 60 while the cold air path 74 generally refers to a flow path upstream of the mixing section 75 and devoid of such heat transferring components. In the illustrated embodiment, the evaporator 30 is disposed upstream of the cold air path 74 to cause the air to be cooled prior to entering the cold air path 74, but the evaporator 30 may alternatively be positioned within the cold air path 74 without necessarily departing from the scope of the present invention.

The warm air path 72 includes the internal condenser 24 and a secondary heater 78. In the illustrated embodiment, the secondary heater 78 may be an electrically powered PTC heater in electrical communication with a power source of the vehicle, such as the vehicle battery. However, the secondary heater 78 may alternatively be a heater core in fluid communication with the coolant of the coolant circuit 40 in order to further utilize the waste heat generated by the at least one heat generating component 42, as desired. The warm air path 72 may also be provided in the absence of a secondary heater 78 without necessarily departing from the scope of the present invention.

A temperature control door 80 is configured to control a distribution of the air passing through each of the warm air path 72 and the cold air path 74. The temperature control door 80 is adjustable to a first position wherein the cold air path 74 is entirely open while the warm air path 72 is entirely closed, a second position wherein the cold air path 74 is entirely closed while the warm air path 72 is entirely open, and a plurality of positions intermediate the first position and the second position wherein a portion of the air flow passes through each of the warm air path 72 and the cold air path 74. The temperature control door 80 is illustrated as a flap or plate having an axis of rotation disposed adjacent a downstream end of the wall 61 forming the division between the warm flow path 72 and the cold flow path 74. However, the temperature control door 80 may include any structure suitable for distributing the air between the warm air path 72 and the cold air path 74, including having a substantially fan shaped appearance similar to the air source control door 66 with an axis of rotation thereof spaced from a downstream end of the wall 61. The temperature control door 80 may alternatively be formed as a sliding mechanism configured to variably block or open the warm air path 72 and the cold air path 74, as desired.

The mixing section 75 is disposed downstream of the wall 61 (and hence a division between the warm air path 72 and the cold air path 74) and refers generally to a portion of the HVAC module 60 wherein the air passing through the warm air path 72 and the cold air path 74 may recombine and mix to a desired temperature in accordance with the selected mode of operation of the heat pump system 10.

A plurality of distribution flow paths 82a, 82b, 82c is formed downstream of the mixing section 75, wherein each of the distribution flow paths 82a, 82b, 82c is in fluid communication with one or more vents (not shown) configured for delivering the air to specified regions within the cabin of the vehicle. For example, a first distribution flow path 82a provides fluid communication between the mixing section 75 and one or more defrost or side window vents of the vehicle, a second distribution flow path 82b provides fluid communication between the mixing section 75 and one or more panel vents of the vehicle, and a third distribution flow path 82c provides fluid communication between the mixing section 75 and one or more floor vents of the vehicle. The first distribution flow path 82a includes a first vent door 83a, the second distribution flow path 82b includes a second vent door 83b, and the third distribution flow path 82c includes a third vent door 83c. Each of the vent doors 83a, 83b, 83c is adjustable between a fully closed position closing off flow through the corresponding flow path 82a, 82b, 82c, a fully open position allowing maximum flow through the corresponding flow path 82a, 82b, 82c, and a plurality of intermediate positions for variably controlling the flow through the corresponding flow path 82a, 82b, 82c. The vent doors 83a, 83b, 83c are illustrated as flaps having a centrally located axis of rotation, but it should be understood that the vent doors 83a, 83b, 83c may have any suitable configuration for varying the flow through the corresponding flow path 82a, 82b, 82c without departing from the scope of the present invention.

A purge flow path 85 branches from the warm air path 72 at a location downstream of the internal condenser 24 and upstream of the mixing section 75. In the embodiment shown in FIG. 2, the purge flow path 85 branches from the warm air path 72 at a position upstream of the temperature control door 80. The purge flow path 85 provides fluid communication between the warm air path 72 and the ambient environment. Accordingly, any air passing through the purge flow path 85 is not subsequently passed to the cabin of the vehicle, but is instead removed from the vehicle. The purge flow path 85 may be coupled to any form of duct or similar structure suitable for transferring the purged air from the HVAC module 60 and to the exterior of the vehicle.

A purge control door 87 is disposed at an entry to the purge flow path 85 and is configured to selectively allow for the air passing through the warm air path 72 to be exhausted from the warm air path 72 through the purge flow path 85. The purge control door 87 is illustrated as a flap having a centrally located axis of rotation, but it should be understood that any door or valve configuration may be utilized to selectively control the flow of the purged air through the purge flow path 85. The purge control door 87 may be adjustable between a fully open position allowing for a maximum flow of the purge air therethrough, a fully closed position allowing substantially no flow of the purge air therethrough, and a plurality of intermediate positions allowing a desired flow of the purge air therethrough.

Each of the components described herein as adjustable between various different positions may be in signal communication with a control system (not shown) of the vehicle. The control system may be configured to both receive inputs from a passenger of the vehicle (such as temperature settings, blower settings, and mode settings) and to react to various different sensed conditions of the vehicle. For example, the control system may monitor the temperature of the ambient environment or the temperature of the at least one heat generating component 42 in order to determine when to initiate a purge feature of the HVAC module 60 as described hereinafter.

Figure 3:
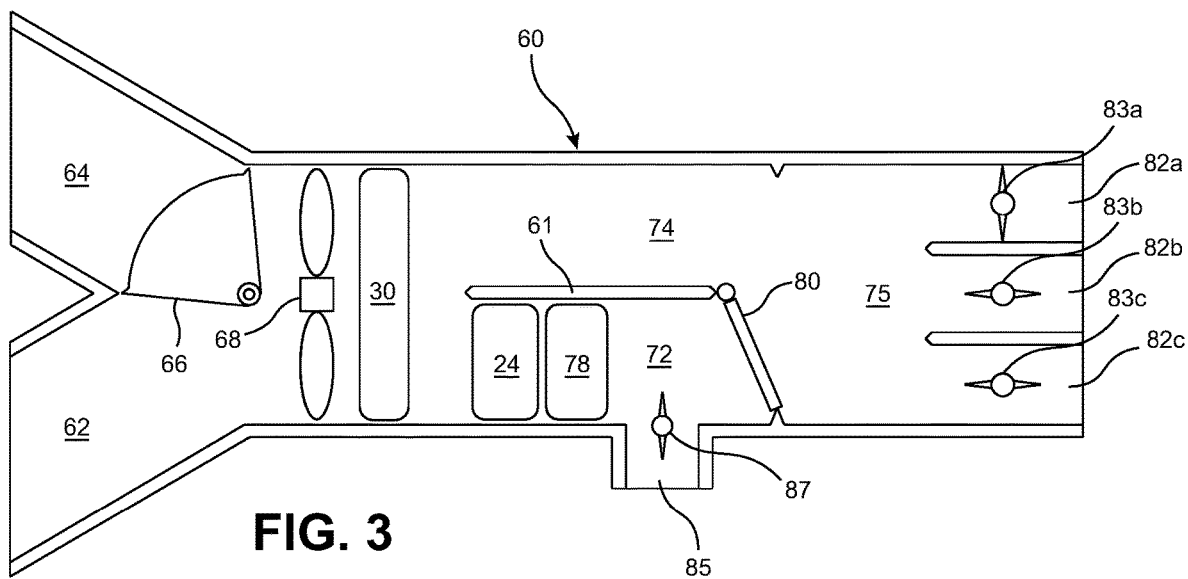
FIG. 3 is a cross-sectional view of the HVAC module of FIG. 1 configured for a second mode of operation thereof wherein the purge flow path of the HVAC module is opened to promote maximized cooling of a cabin of the vehicle.
Figure 4:
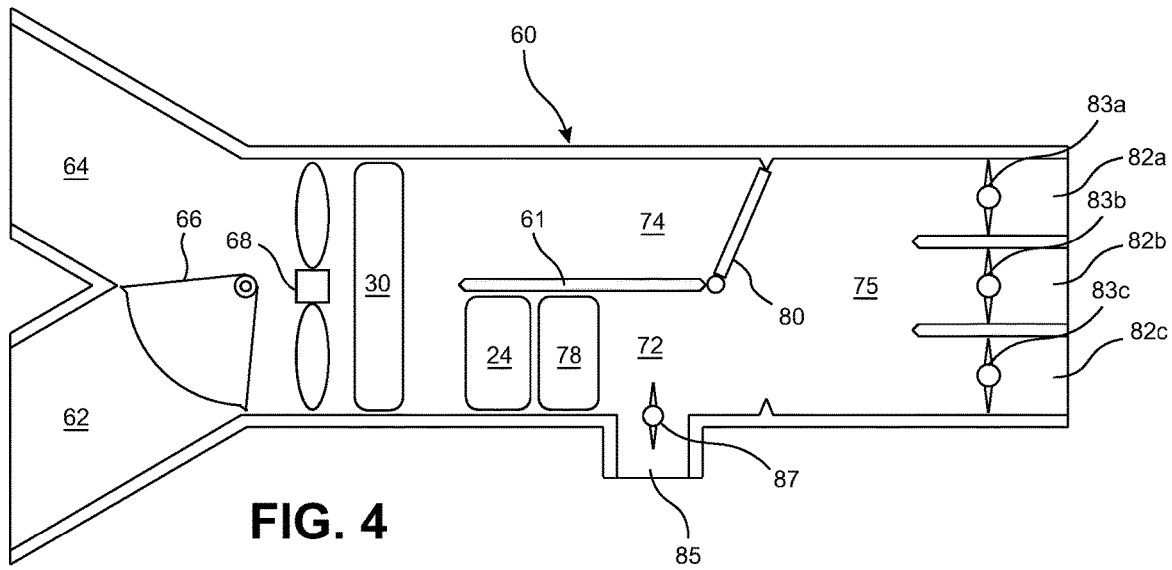
FIG. 4 is a cross-sectional view of the HVAC module of FIG. 1 configured for a third mode of operation thereof, wherein the third mode of operation is an air conditioning or cooling mode wherein the purge flow path of the HVAC module is opened to promote maximized cooling of a heat generating component of the heat pump system.

FIGS. 2-4 illustrate the HVAC module 60 with respect to various different modes of operation of the heat pump system 10. FIG. 2 shows the purge control door 87 in the fully closed position to close off flow to the purge flow path 85. As such, all air allowed to pass through either of the warm air path 72 or the cold air path 74 flows through the mixing section 75 of the HVAC module 60 before being distributed to the cabin of the vehicle via the distribution flow paths 82a, 82b, 82c. The HVAC module 60 with the closed off purge flow path 85 accordingly operates in substantially conventional fashion as described hereinafter.

The blower unit 68 causes a supply of air to be drawn into the HVAC module 60 through one or both of the recirculation flow path 62 and the fresh air flow path 64 depending on the position of the air source control door 66. The air is then passed through the evaporator 30 in order to cool the air before the air is distributed between the warm air path 72 and the cold air path 74 based on the position of the temperature control door 80. As explained hereinabove, the air may be delivered exclusively to one of the warm air path 72 or the cold air path 74 or the air may be distributed partially to each of the two air paths 72, 74. Any air passing through the warm air path 72 is heated by the internal condenser 24 and may be further selectively heated by the secondary heater 78. The air then flows through the mixing section 75 before being distributed to the distribution flow paths 82a, 82b, 82c based on the position of each of the vent control doors 83a, 83b, 83c.

As one non-limiting example, the HVAC module 60 is shown in FIG. 2 as exclusively receiving recirculated air originating from the cabin of the vehicle which is then redelivered to the cabin via the first distribution flow path 82a and the third distribution flow path 82c. The temperature control door 80 is also illustrated as being positioned wherein a majority of the air passing through the evaporator 30 is subsequently caused to flow through the warm air path 72 to result in relatively warm air for distribution to the cabin of the vehicle. However, one skilled in the art should appreciate that a variety of different combinations of positions for each of the air source control door 66, the temperature control door 80, and the vent control doors 83a, 83b, 83c may be utilized to deliver air to desired regions of the cabin while at a desired temperature and humidity. It should also be apparent to one skilled in the art that the heating capacity or the cooling capacity of the heat pump system 10 with respect to a given mode of operation thereof may further be varied by controlling various aspects of the heat pump system 10, such as the distribution of the refrigerant at the three-way valve 27 of the refrigerant circuit 20, the adjustment of each of the disclosed expansion elements 28, 38, the temperature of the at least one heat generating component 42 when in heat transfer relationship with the refrigerant circuit 20, the rotational speed of each disclosed blower unit 21, 68, the activation or non-activation of the secondary heater 78, or the compression capacity of the compressor 22, as non-limiting examples.

In contrast to FIG. 2, FIGS. 3 and 4 illustrate the HVAC module 60 during two independent modes of operation of the heat pump system 10 wherein the purge flow path 85 is opened to allow for the air passing through the warm air path 72 to be exhausted to the ambient environment. The purge flow path 85 may be utilized under circumstances wherein it is desired to reject a maximum amount of heat from the refrigerant when passing through the condensers 24, 26 in order to improve the heat exchange capacity of the refrigerant when passing through either of the evaporator 30 or the chiller 39.

Such a circumstance may occur when a maximum amount of cooling capacity is desired for cooling the air entering the cabin of the vehicle or for cooling the associated heat generating component in conjunction with the occurrence of an especially high ambient air temperature, thereby placing a greater load on the heat pump system to achieve the desired degree of cooling. In a traditional HVAC system, the associated warm air path may be normally closed off when the HVAC system is configured for delivering maximally cooled air to the cabin of the vehicle, thereby indicating that a flow of air will not pass over the associated internal condenser in order to efficiently cool the relatively high temperature gaseous refrigerant passing therethrough. As such, only the external condenser is utilized to reject heat from the refrigerant prior to expansion of the refrigerant in an associated expansion element. The refrigerant is accordingly at an elevated temperature level when entering a corresponding evaporator or chiller, which in turn reduces a heat exchange capacity of the refrigerant when intended to provide a cooling effect.

FIG. 3 illustrates the HVAC module 60 when in a configuration suitable for a cabin cooling mode (air conditioning mode) of the heat pump system 10. The cabin cooling mode may include an adjustment of the three-way valve 27 to pass the refrigerant exclusively through the evaporator pathway 36 and hence the evaporator 30 when the refrigerant circulates through the refrigerant circuit 20. The evaporator expansion element 28 may also be adjusted to cause a maximum reduction in pressure and temperature of the refrigerant passing therethrough to increase a cooling capacity of the evaporator 30. The blower unit 21 and the blower unit 68 may each be controlled to rotate at a maximum rotational speed in order to cause a maximized volume of air to pass through each of the internal condenser 24 and the external condenser 26. The air source door 66 may also be adjusted to completely or at least partially open the fresh air flow path 64 to avoid an occurrence of air disposed within the vehicle cabin being removed and exhausted to the ambient environment when flowing through the recirculation flow path 62.

The cabin cooling mode further includes the temperature door control 80 adjusted to close off the flow of air from the warm air path 72 to the mixing section 75 of the HVAC module 60. As such, the air entering the mixing section 75 flows exclusively through the cold air path 74 after having been cooled when passing through the evaporator 30. The cooled air is then able to be distributed to the cabin of the vehicle through any desired combination of the distribution flow paths 82a, 82b, 82c in accordance with a passenger provided setting or selection. In the illustrated embodiment, the second and third vent control doors 83b, 83c are placed in the open position to allow flow through the second and third distribution flow paths 82b, 82c while the first vent control door 83a is placed in the closed position to close off flow through the first distribution flow path 82a.

The cabin cooling mode of the heat pump system 10 additionally includes the purge control door 87 adjusted to the fully open position to allow for any air passing through the warm air path 72 to exit the HVAC module 60 through the purge flow path 85. The air passing through the warm air path 72 first flows through the internal condenser 24 where the air is heated by the relatively high temperature gaseous refrigerant having just exited the compressor 22. The heating of the air passing through the internal condenser 24 in turn lowers the temperature of the refrigerant exiting the internal condenser 24. The heated air is then exhausted from the warm air path 72 and to the ambient environment through the purge flow path 85.

The positioning of the purge flow path 85 and the purge control door 87 relative to the remaining components of the HVAC module 60 provides numerous benefits in achieving the cabin cooling mode of the heat pump system 10. First, the positioning of the internal condenser 24 downstream of the evaporator 30 allows for the air passing through the warm air path 72 to be first cooled during passage through the evaporator 30, which in turn increases a capacity for the cooled air to reject heat from the refrigerant passing through the internal condenser 24. Second, the exhausting of the air heated by the internal condenser 24 to the ambient environment at a position upstream of the mixing section 75 allows for heat to be removed from the refrigerant within the internal condenser 24 without later reintroducing this heat to the air being delivered to the cabin of the vehicle. The heat pump system 10 is therefore capable of rejecting heat from the refrigerant within each of the internal condenser 24 and the external condenser 26 in order to increase a cooling capacity of the refrigerant within the evaporator 30. Third, the positioning of the internal condenser 24 within the HVAC module 60 allows for the use of a single blower unit 68 for both delivering the air to the cabin of the vehicle and for exhausting the air to the ambient environment through the purge flow path 85, hence the use of the purge flow path 85 can be achieved without requiring the powering of another associated blower or similar component.

FIG. 4 illustrates the HVAC module 60 when in a configuration suitable for a component cooling mode of the heat pump system 10. The component cooling mode may occur when a conditioning of the air entering the cabin of the vehicle is not required. For example, the component cooling mode may relate to a period of rapid charging of a battery of the vehicle wherein the battery is in need of maximized cooling while the vehicle is otherwise inactive and therefore does not require a heating or cooling of the cabin of the vehicle. The component cooling mode may include an adjustment three-way valve 27 to pass the refrigerant exclusively through the coolant circuit pathway 35 and the chiller 39 when the refrigerant circulates through the refrigerant circuit 20. The chiller expansion element 38 may also be adjusted to cause a maximum reduction in pressure and temperature of the refrigerant passing therethrough to increase a cooling capacity of the chiller 39. The blower unit 21 and the blower unit 68 may each be controlled to rotate at a maximum rotational speed in order to cause a maximized volume of air to pass through each of the internal condenser 24 and the external condenser 26. The air source control door 66 may be adjusted to a position wherein only fresh ambient air is flowed through the HVAC module 60.

The component cooling mode further includes the temperature door control 80 adjusted to close off the flow of air from the cold air path 74 to the mixing section 75 of the HVAC module 60 while the purge control door 87 is in the fully open position to open flow through the purge flow path 85. Additionally, each of the distribution flow paths 82a, 82b, 82c disposed downstream of the mixing section 75 may be closed off to prevent an undesired flow of conditioned air into the cabin of the vehicle during operation in the component cooling mode. As such, all of the air entering the HVAC module 60 flows exclusively through the warm air path 72 when flowing towards the purge flow path 85, and hence all of the air passing through the HVAC module 60 passes through the internal condenser 24 prior to exiting the HVAC module 60. The entirety of the air passing through the HVAC module 60 is accordingly able to exchange heat with the refrigerant passing through the internal condenser, which in turn rejects heat from the refrigerant to give the refrigerant additional cooling capacity when reaching the chiller 39. The component cooling mode accordingly includes a maximized rejection of heat from the refrigerant within each of the internal condenser 24 and the external condenser 26 without affecting the condition of the air entering the cabin of the vehicle.

The cabin cooling mode and the component cooling mode are each described as including exclusive flow of the refrigerant through one or the other of the coolant circuit flow path 35 and the evaporator flow path 36, but it should be appreciated by one skilled in the art that the advantages of the present invention may be appreciated regardless of the distribution of the refrigerant between the disclosed flow paths 35, 36. For example, the opening of the purge flow path 85 may occur during the simultaneous cooling of each of the air passing through the HVAC module 60 and the at least one heat generating component 42 without necessarily departing from the scope of the present invention. The benefits of the additional cooling capacity of the refrigerant due to passing through two distinct condensers may be utilized for any advantageous purpose while remaining within the scope of the present invention. Additionally, although the purge flow path 85 is described as being utilized when encountering especially large loads such as when maximized cooling is needed, it should also be appreciated that the purge feature may be utilized regardless of the load placed on the heat pump system 10.

As explained throughout, the HVAC module 60 may include one of a plurality of different suitable configurations for conditioning the air while still maintaining the purge feature described herein. For example, FIGS. 5 and 6 disclose two modifications of the HVAC module 60 that maintain the ability to perform the modes of operation disclosed herein despite slight differences in the structure and positioning of the components forming the HVAC module 60.

Figure 5:
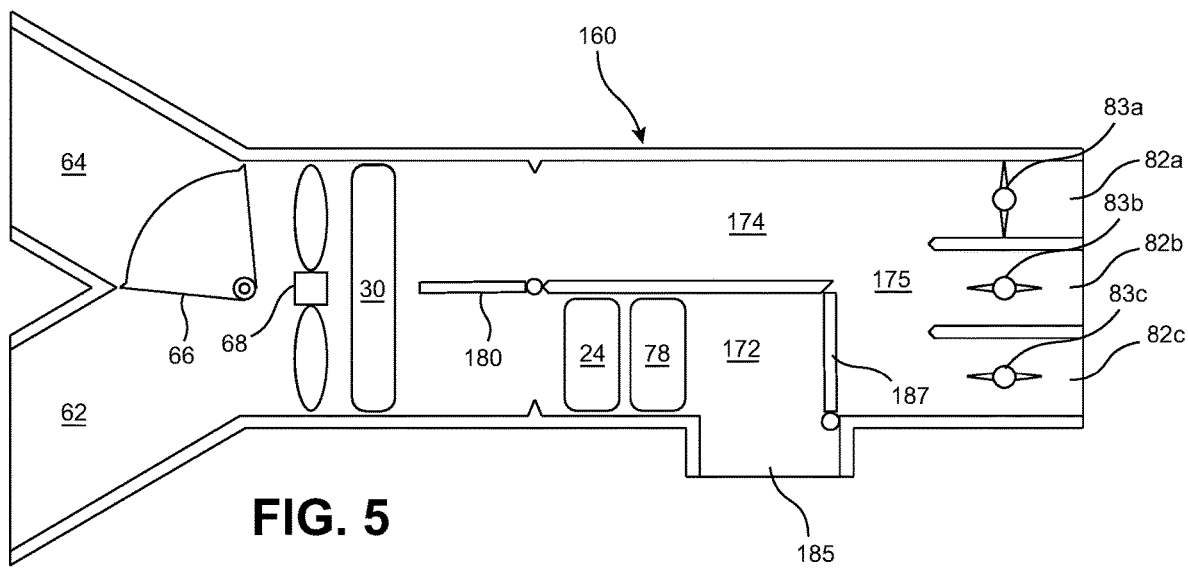
FIG. 5 is a cross-sectional view of an HVAC module according to a second embodiment of the invention.

The HVAC module 160 illustrated in FIG. 5 includes two primary modifications of the HVAC module 60 illustrated in FIGS. 2-4, but otherwise operates in substantially the same manner. A first modification includes the use of a temperature control door 180 disposed at an upstream end of a division between a warm air path 172 and a cold air path 174 defined by the HVAC module 160 rather than the use of the downstream temperature control door. The temperature control door 180 is configured to be positioned to distribute the air passing through the HVAC module 160 to only the warm air path 172, to only the cold air path 174, or to each of the warm air path 172 and the cold air path 174, as desired. The warm air path 172 includes the internal condenser 24 at a position upstream of a purge flow path 185 branching from the warm air path 172. A second modification includes the use of a purge control door 187 selectively positioned to entirely block flow through two different flow paths rather than a single purge flow path to the ambient environment. Specifically, the purge control door 187 is rotatable to a first position wherein the purge control door 187 entirely closes off flow through the purge flow path 185 while allowing flow between the warm air path 172 and a mixing section 175 of the HVAC module 160 and a second position (shown in FIG. 5) wherein the purge control door 187 blocks the flow between the warm air path 172 and the mixing section 175 while diverting the air passing through the warm air path 172 towards the purge flow path 185.

The HVAC module 160 operates in similar fashion to the HVAC module 60 while capable of achieving each of the modes of operation disclosed herein. When the purge feature is not required, the purge control door 187 is placed in the first position to close off flow through the purge flow path 185 while the remainder of the HVAC module 160 operates in a conventional manner for heating/cooling and distributing the air to the cabin of the vehicle. The cabin cooling mode (shown in FIG. 5) includes the temperature control door 180 positioned to allow flow through each of the warm air path 172 and the cold air path 174 while the purge control door 187 is positioned to the second position for causing the air flowing through the warm air path 172 to flow exclusively to the purge flow path 185 and out to the ambient environment. In contrast, the component cooling mode includes the temperature control door 180 positioned to block off flow through the cold air path 174 while the purge control door 187 is again placed in the second position for allowing flow out of the warm air path 172 through the purge flow path 185. The HVAC module 160 accordingly is capable of achieving each of the previously described operating modes while still requiring the control of only two different doors/valves in the form of the temperature control door 180 and the purge control door 187.

Figure 6:
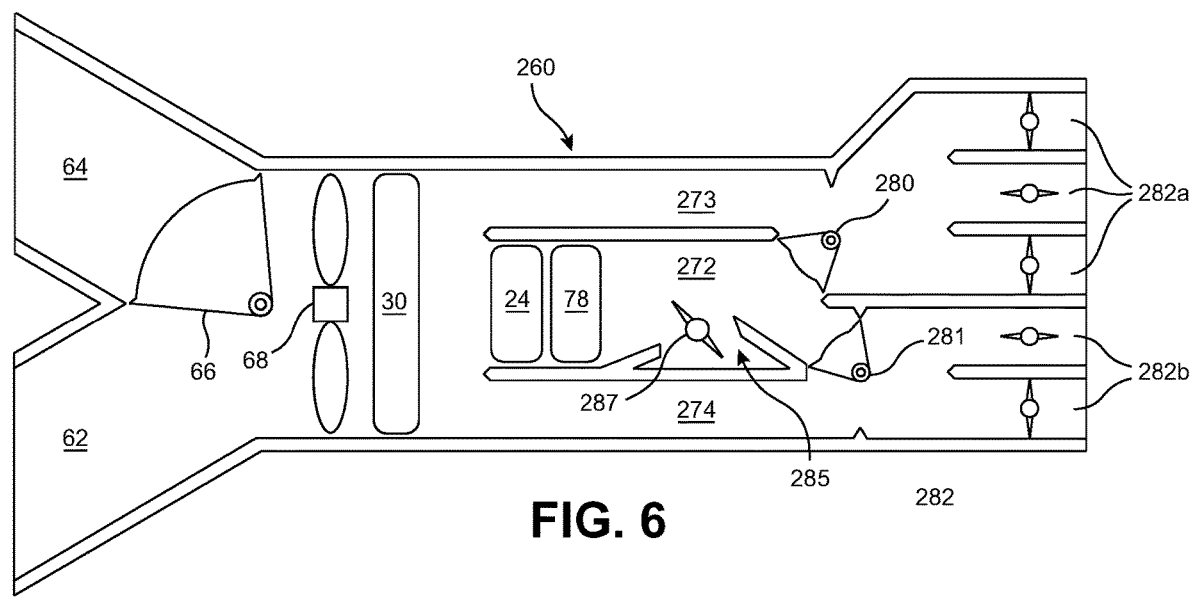
FIG. 6 is a cross-sectional view of an HVAC module according to a third embodiment of the invention.

FIG. 6 illustrates another HVAC module 260 that operates in substantially the same manner as the HVAC module 60 while providing temperature control for two different regions of the cabin of the vehicle. The HVAC module 260 includes a centrally located warm air path 272, a first cold air path 273 formed to a first side of the warm air path 272, and a second cold air path 274 formed to a second side of the warm air path 272. The warm air path 272 includes the internal condenser 24 disposed upstream of a purge flow path 285 branching from the warm air path 272. The purge flow path 285 may extend into or out of the page from the perspective of FIG. 6, as desired, in order to route the purged air to the ambient environment. A purge control door 287 is configured to be adjusted between a first position blocking off flow through the purge flow path 285 and a second position allowing flow through the purge flow path 285.

A first temperature control door 280 is disposed downstream of the first cold air path 273 and the warm air path 272 for controlling a distribution of the air between the first cold air path 273 and the warm air path 272 while also allowing for selective flow towards a first set 282a of distribution flow paths associated with delivering the air to a first region of the vehicle, such as a front seat region of the cabin. A second temperature control door 281 is disposed downstream of the second cold air path 274 and the warm air path 272 for controlling a distribution of the air between the second cold air path 274 and the warm air path 272 while also allowing for selective flow towards a second set 282b of distribution flow paths associated with delivering the air to a second region of the vehicle, such as a rear seat region of the cabin. The HVAC module 260 is accordingly configured to allow for independent temperature control of two different regions of the cabin of the vehicle.

The HVAC module 260 operates in similar fashion to the HVAC module 60 while remaining capable of achieving each of the modes of operation disclosed herein. When the purge feature is not required, the purge control door 287 is positioned to close off flow through the purge flow path 285 while the remainder of the HVAC module 260 operates in a conventional manner for heating or cooling and distributing the air to the cabin of the vehicle. The cabin cooling mode (shown in FIG. 6) includes the first temperature control door 280 positioned to block flow between the warm air path 272 and the first set 282a of the distribution flow paths, the second temperature control door 281 positioned to block flow between the warm air path 272 and the second set 282b of the distribution flow paths, and the purge control door 287 opened to allow for flow through the warm air path 272 to flow out of the HVAC module 260 through the purge flow path 285. The component cooling mode includes the first temperature control door 280 positioned to block flow between the first cold air path 273 and the first set 282a of the distribution flow paths, the second temperature control door 281 positioned to block flow between the second cold air path 274 and the second set 282b of the distribution flow paths, the purge control door 287 opened to allow for flow through the warm air path 272 to flow out of the HVAC module 260 through the purge flow path 285, and the closing of each of the two sets 282a, 282b of the distribution flow paths to prevent the undesired flow of conditioned air into the cabin of the vehicle.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A heating, ventilating, and air conditioning (HVAC) module for a heat pump system, the module comprising:
   a warm air path including an internal condenser;
   a cold air path formed independently from the warm air path;
   a purge flow path branching from the warm air path at a position downstream of the internal condenser with respect to a flow of air through the module, the purge flow path providing fluid communication between the warm air path and the ambient environment;
   a temperature control door controlling a distribution of the flow of air through the module between the warm air path and the cold air path thereof; and
   a purge control door adjustable between a first position preventing fluid communication between the warm air path and the purge flow path and a second position allowing fluid communication between the warm air path and the purge flow path, wherein a component cooling mode of the heat pump system provides cooling to a heat generating component of a vehicle in heat exchange relationship with a refrigerant passing through the internal condenser, and wherein the component cooling mode includes adjusting the purge control door to allow for fluid communication between the warm air path and the purge flow path and adjusting the temperature control door to prevent the flow of air from flowing through the cold air path.

2. The HVAC module of claim 1, wherein the temperature control door is disposed downstream of the purge flow path with respect to the flow of air.

3. The HVAC module of claim 1, wherein the temperature control door is disposed upstream of the purge flow path with respect to the flow of air.

4. The HVAC module of claim 1, wherein an evaporator is disposed upstream of the warm air path and the cold air path with respect to the flow of air.

5. The HVAC module of claim 1, further comprising a mixing section disposed downstream of the warm air path and the cold air path with respect to the flow of air and a plurality of distribution flow paths disposed downstream of the mixing section with respect to the flow of air, each of the distribution flow paths providing fluid communication between the mixing section and a passenger cabin of the vehicle.

6. A heat pump system for a vehicle comprising:
   a refrigerant circuit including a compressor, an internal condenser, and an external condenser; and
   a module for a heating, ventilating, and air conditioning system, the module including a warm air path including the internal condenser, a cold air path formed independently from the warm air path, a purge flow path branching from the warm air path at a position downstream of the internal condenser with respect to a flow of air through the module and providing fluid communication between the warm air path and the ambient environment, a temperature control door controlling a distribution of the flow of air through the module between the warm air path and the cold air path thereof, and a purge control door adjustable between a first position preventing fluid communication between the warm air path and the purge flow path and a second position allowing fluid communication between the warm air path and the purge flow path, wherein the refrigerant circuit is in heat exchange relationship with a heat generating component of the vehicle, wherein a component cooling mode of the heat pump system provides cooling to a heat generating component of the vehicle in heat exchange relationship with a refrigerant passing through the internal condenser, and wherein the component cooling mode includes adjusting the purge control door to allow for fluid communication between the warm air path and the purge flow path and adjusting the temperature control door to prevent the flow of air from flowing through the cold air path.

7. The heat pump system of claim 6, wherein an evaporator of the refrigerant circuit is disposed in the module at a position upstream of the warm air path and the cold air path with respect to the flow of air.

8. The heat pump system of claim 6, wherein the external condenser is disposed exterior to the module.

9. The heat pump system of claim 6, wherein a first blower unit is in fluid communication with the module and a second blower unit is in fluid communication with the external condenser.

10. A method of operating a heat pump system of a vehicle, the method comprising the steps of:
providing a heating, ventilating, and air conditioning module, the module including a warm air path including an internal condenser, a cold air path formed independently from the warm air path, a purge flow path branching from the warm air path at a position downstream of the internal condenser with respect to a flow of air through the module, and a purge control door disposed at an entrance to the purge flow path, wherein the purge flow path provides fluid communication between the warm air path and the ambient environment; and
adjusting the purge control door to selectively provide fluid communication between the warm air path and the purge flow path; and
adjusting a temperature control door to control a distribution of the flow of air through the module between the warm air path and the cold air path thereof, wherein a component cooling mode of the heat pump system provides cooling to a heat generating component of the vehicle in heat exchange relationship with a refrigerant passing through the internal condenser, and wherein the component cooling mode includes adjusting the purge control door to allow for fluid communication between the warm air path and the purge flow path and adjusting the temperature control door to prevent the flow of air from flowing through the cold air path.

11. The method of claim 10, wherein a cabin cooling mode of the heat pump system provides cooled air to a cabin of the vehicle, wherein the cabin cooling mode includes adjusting the purge control door to allow for fluid communication between the warm air path and the purge flow path and adjusting the temperature control door to distribute the flow of air to each of the warm air path and the cold air path.

12. The method of claim 11, wherein the cabin cooling mode includes a first portion of the flow of air passing through the cold air path and distributed to a cabin of the vehicle and a second portion of the flow of air passing through the warm air path and purged to the ambient environment.

13. The method of claim 10, wherein the component cooling mode includes an entirety of the flow of air passing through the warm air path and purged to the ambient environment.

14. The method of claim 10, wherein a refrigerant circuit of the heat pump system includes the internal condenser and an external condenser disposed exterior to the module.

15. The method of claim 14, further comprising a step of rejecting heat from the refrigerant circulated by the refrigerant circuit in each of the internal condenser and the external condenser in order to maximize a cooling capacity of the refrigerant circuit.

* * * * *